United States Patent [19]

Bliss

[11] Patent Number: 4,928,344
[45] Date of Patent: May 29, 1990

[54] ELECTRICALLY HEATED WIPER BLADE UTILIZING FIBROUS CARBON HEATING ELEMENT

[76] Inventor: William R. Bliss, 120 Possum Hollow Rd., Newark, Del. 19711

[21] Appl. No.: 182,507

[22] Filed: Apr. 18, 1988

[51] Int. Cl.⁵ .......................... H05B 3/14; H05B 3/36; B60S 1/38
[52] U.S. Cl. .................................. 15/250.06; 219/201; 219/203; 219/522; 219/544; 219/553; 338/214
[58] Field of Search ............... 219/201, 203, 522, 549, 219/552, 553, 548, 544; 15/250.06, 250.05; 338/214

[56] References Cited

U.S. PATENT DOCUMENTS

| | | | |
|---|---|---|---|
| 1,642,570 | 9/1927 | Wood et al. | 15/250.06 |
| 1,724,948 | 8/1929 | Maertins . | |
| 2,194,671 | 3/1940 | Pauro | 15/250.06 |
| 2,422,761 | 6/1947 | Ungerland | 15/250.06 |
| 2,427,502 | 9/1947 | Marick | 15/250.06 |
| 2,550,504 | 4/1951 | Vidrick et al. | 15/250.06 |
| 2,733,472 | 2/1956 | Karstens et al. | 15/250.06 |
| 3,201,818 | 8/1965 | Linker | 15/250.06 |
| 3,249,959 | 5/1966 | Theckston | 15/250.06 |
| 3,372,421 | 3/1968 | Meltzer | 15/250.06 |
| 3,428,993 | 2/1969 | Rickett | 15/250.06 |
| 3,489,884 | 1/1970 | Waseleski | 15/250.05 |
| 3,530,525 | 9/1970 | Abel | 15/250.07 |
| 3,587,129 | 6/1971 | Linker | 15/250.06 |
| 3,639,938 | 2/1972 | Golden | 15/250.06 |
| 3,718,940 | 3/1978 | Bode | 15/250.06 |
| 3,757,088 | 9/1973 | Osborn | 219/553 |
| 3,859,506 | 1/1975 | Weckstein | 338/214 X |
| 3,948,811 | 4/1976 | Clary et al. . | |
| 4,473,919 | 10/1984 | Fritz, Jr. | 15/250.04 |
| 4,497,083 | 2/1985 | Nielsen, Jr. et al. | 15/250.06 |
| 4,513,468 | 4/1985 | Hayden | 15/250.36 |
| 4,593,175 | 6/1986 | Bowser et al. | 219/203 |

Primary Examiner—Anthony Bartis
Attorney, Agent, or Firm—Cushman, Darby & Cushman

[57] ABSTRACT

A heated windshield wiper blade unit suitable for incorporation into existing windshield wiper assemblies. The unit comprises an elastic wiper blade, for example RTV rubber, and a flexible, fibrous carbon heating element disposed in the blade substantially along its entire length. The heating element contains a plurality of fibrous carbon strands coaxially surrounded by a heat shrunk polymeric tube. A live wire and a ground wire enter the blade and the heat shrunk polymeric tube at an intermediate point and extend through the tube to establish electrical contact with the respective first and second ends of the fibrous carbon strands. The wires preferably enter a side wall of the blade half way along its length and are insulated with a "tetrafluoroethylene polymer".

5 Claims, 1 Drawing Sheet

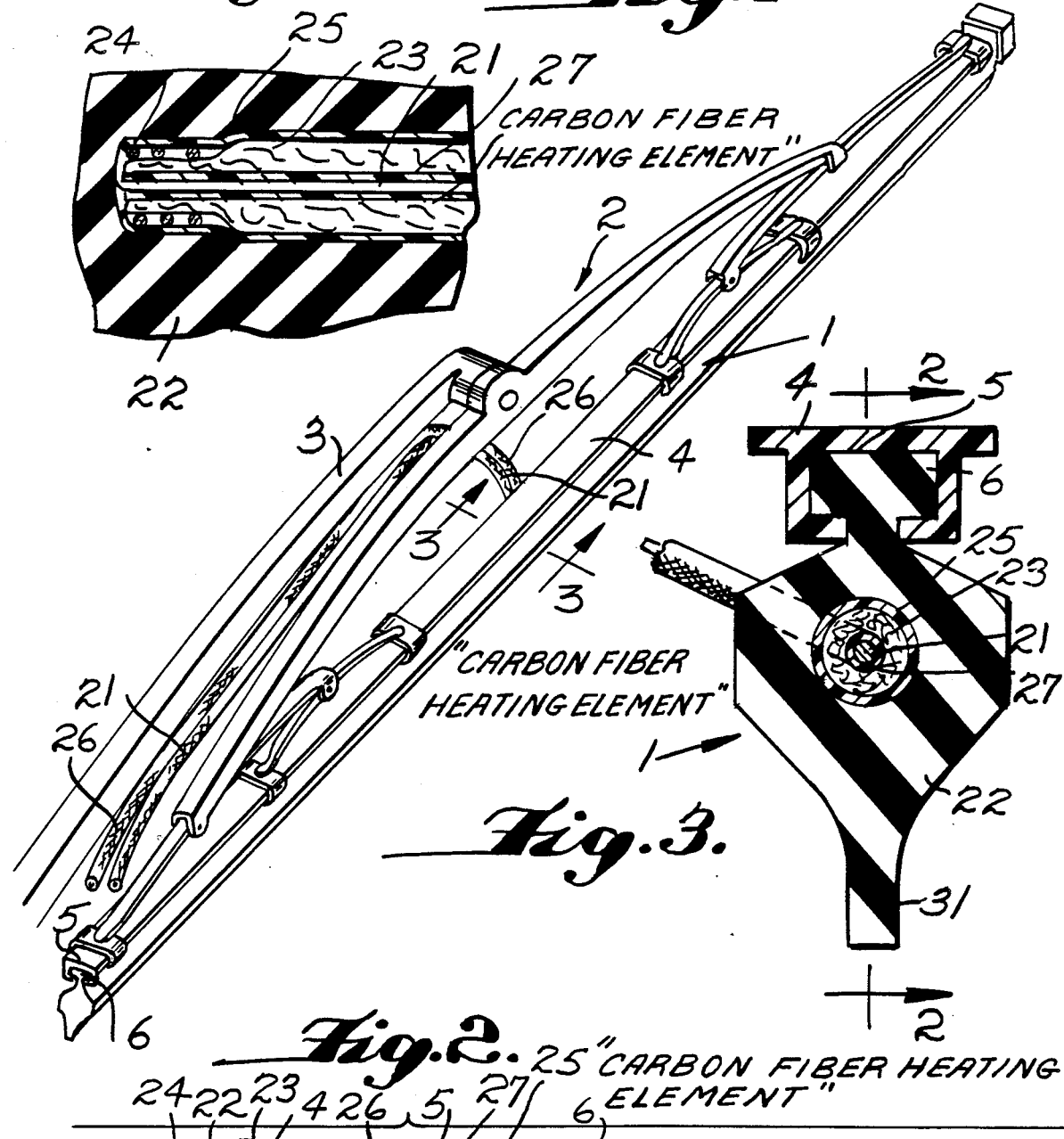
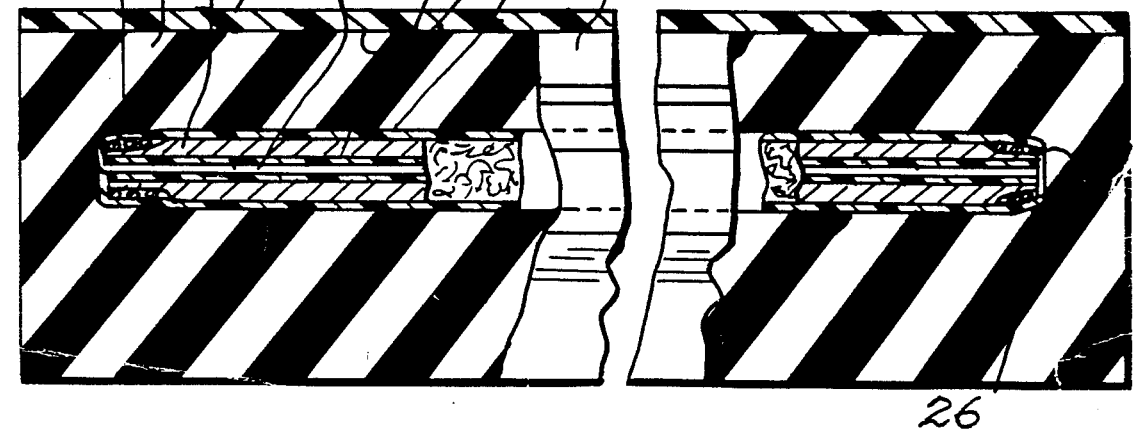

ELECTRICALLY HEATED WIPER BLADE UTILIZING FIBROUS CARBON HEATING ELEMENT

BACKGROUND OF THE INVENTION

The present invention relates to a new, flexible, heated wiper blade unit. More particularly, the invention relates to a wiper blade unit suitable for incorporation into new or existing windshield wiper assemblies.

Windshield wipers conventionally function by reciprocating a blade back and forth across a section of a windshield in front of the driver or passenger of a vehicle. Wipers can also be installed on the rear window of a vehicle, or on mirrors, headlights, or other lights. The wiper blade of the present invention is intended to be used in all or all of these situations.

In cold inclement weather, precipitation such as snow, sleet or rain may freeze and accumulate on surfaces to be cleared by the wiper. Ice may accumulate on the blade body and edge, lifting the blade from the windshield or other surface. As ice accumulates on the edge, the blade no longer efficiently clears precipitation from the windshield, and the windshield may frost over entirely. Alternatively, the blade may freeze in position at some point during its travel stroke.

Wiper blades are known in which resistive wire heating elements are embedded in the blade itself or positioned above the blade on the wiper assembly.

Devices which heat the metal assembly of the windshield wiper fail to efficiently heat the blade. The blade is primarily responsible for clearing accumulated precipitation from the windshield.

Wiper blades with incorporated resistive wire heating elements are often not sufficiently flexible to be used with windshields of any desired lateral or longitudinal curvature. Moreover, flexure of the blade during normal wiper operation tends to work harden wire heating elements, causing eventual failure of the elements and loss of heat production.

In order to make the blades more flexible, the prior art devices use a multitude of very thin wire-type heating elements, thus increasing the cost of production. Utilizing many very thin wires also causes extremely localized heating, placing undue thermal stress on the elastic material of the blade. Furthermore, many prior art devices have used expensive resistive materials such as NICHROME wires, and often require specialized wiper blade frames and/or wire arm assemblies.

It is therefore an object of the present invention to provide a flexible, heated wiper blade suitable for incorporation into new or existing windshield wiper assemblies.

Another object of the present invention is to provide a flexible wiper blade able to adapt to use on windshields having most any lateral or longitudinal curvature.

Another object of the present invention is to provide a heated wiper blade which is inexpensive to produce, is not fatigued by the repeated stresses of reciprocation, and is easy to replace and install.

SUMMARY OF THE INVENTION

In accordance with the above objects, there has been provided a heated windshield wiper blade unit comprising an elastic wiper blade having a length and, in cross section, a geometric center. The unit comprises a flexible, fibrous carbon heating element disposed in the blade and extending substantially the entire length of the wiper blade. A first live wire enters the blade at an intermediate point along its length and establishes an electrical connection with a first end of the heating element. A second ground wire enters the blade at an intermediate point along its length and establishes an electrical connection with a second end of the heating element.

According to a preferred embodiment of the present invention, the flexible, fibrous carbon heating element is coaxially surrounded by a heat shrunk tube substantially along its entire length.

Preferably, the flexible, fibrous heating element is positioned in the geometric center of the wiper blade.

Further objects, features and advantages of the present invention will become apparent from the description of the preferred embodiment when considered together with the attached Figures of drawing.

BRIEF DESCRIPTION OF THE DRAWINGS

In the drawings:

FIG. 1 is a perspective view of a conventional windshield wiper assembly incorporating the heated wiper blade unit according to the present invention;

FIG. 2 is a cut-away view of a section of the wiper unit according to the present invention taken along its long axis on the section line 2—2 in FIG. 3;

FIG. 3 is a cross section taken along line 3—3 I-I in FIG. 1; and

FIG. 4 is a close-up view of the live wire making electrical contact with the heating element.

DESCRIPTION OF THE PREFERRED EMBODIMENT

FIG. 1 shows a heating windshield wiper blade unit 1 according to the present invention attached to a windshield wiper assembly generally indicated by 2. The windshield wiper assembly contains a reciprocating arm 3 and spine 4. The spine 4 has a grooved channel 5 for slidably holding the flanged rib 6 of the wiper blade unit 1, as shown more clearly in FIG. 3.

FIG. 2 shows first live wire conductor 21 disposed in the blade 22 of unit 1. Live wire 21 enters blade 22 in a side wall of blade 22 at an intermediate point along the length of blade 22. Wire 21 having insulation 27 extends along the length of the blade until substantially near one end, where it establishes electrical contact with carbon fiber heating element 23. A bare end 24 of wire 21 establishes electrical contact with heating element 23 by winding around element 23. Heat shrinkable tubing 25 surrounds heating element 23 and the wire 21.

Ground wire 26 enters blade 22 adjacent to wire 21 and passes along the length of blade 22 until its bare end establishes electrical contact with heating element 23 in a manner identical to that described above for bare end 24.

FIG. 3 shows a cross section of heated wiper blade unit 1 along line 3—3 of FIG. 1. The cross section of FIG. 3 is in the region where wire 21 is conducted within heating element 23. The wire 21 is shown in the center of heating element 23 for clarity. In actuality, wire 21 may be disposed at any position within heat shrinkable tubing 25. Blade 22 further comprises squeegee rib 31 for establishing intimate contact with the surface to be wiped. Squeegee rib 31 is along the mirror plane. The mirror plane also contains live wire 21 and flanged rib 6.

FIG. 4 shows bare end 24 of live wire 21 wound around heating element 23 within heat shrinkable tubing.

The blade 22 is preferably made of room temperature vulcanizing (RTV) rubber.

Preferred RTV materials have a Shore A Durometer hardness of from 60-70, good tear strength resistance, low wire and post cure shrinkage, and a usable temperature range of −60° F. to 400° F. Preferable materials are silicone rubbers, but other suitable materials may be used. One such other material is sold under the tradename of NORDEL.

Wires 21 and 26 are preferably insulated with tetrafluoroethylene polymer (TFE).

The fibrous carbon heating element 23 has an electrical conductivity which can be tailored to produce a desired heat output with any given voltage.

Heat production is a function of carbon fiber conductivity. The more conductive a material is, the more heat will be produced when it forms the link between positive and negative electrical sources of any given voltage. At lower voltages, such as the 12 volts of most automobiles' electrical systems, a fiber of fairly high conductivity is needed to produce the temperatures sufficient for the heated blades. Preferable temperatures are about 300° F.

EXAMPLE I

The carbon fiber used in this example has a resistance of about 11 ohms for a 12-inch length per manufactured woven strand. In order to achieve the 300° F. with 12V DC power, a resistance of about 5.5 ohms is required, so two individual strands are run in a 12-inch long blade to achieve the desired heat. The strands run inside of the heat-shrunk tubing in the blade and are electrified by having the bare ends of the live and ground wires wrapped around the ends of the strands. In this manner they are electrically connected essentially parallel to one another. No significant electrical conduction takes places between the individual strands.

EXAMPLE II

A single 18-inch long carbon fiber strand has a resistance of 16.5 ohms (11 ohms per 12 inches $\times$ 1.5 ft = 16.5 ohms). To reduce the resistance to 5.5 ohms, three carbon strands are required in an 18-inch long blade produce the required heat.

With any given voltage, the number of carbon fiber strains can be tailored the produce the desired heat output for wiper blades of various lengths, from 1 inch long up to many inches long.

The heat shrinkable tubing is readily obtained, made from various materials, and has various wall thicknesses and diameters. The material must be one which can withstand continuous temperatures of at least 300° F. Tubing made from tetrafluoroethylene polymer outlasts that made from polyolefinic polymers, so tetrafluoroethylene polymer is the preferred material. Tests of heated blades using Polyolefin show that an expected average life of at least 300 hours can be obtained. A blade assembled with tetrafluoroethylene polymer has not failed after almost 600 hours running time life. Much longer running times can be expected from these blades. In addition, other suitable materials could be used for the heat shrinkable tubing which would withstand the long-term heat effects of the carbon heating element. Two such suitable material are sold under the trade names of KYNAR and TEFZEL. KYNAR is the registered brand name for polyvinylinene fluoride made by the Penwalt Corporation. It is an extrudable material which can be used to make irradiated tubing for the purpose of being heat shrunk around the other element to contain and/or electrically insulate the element. TEFZEL is a registered trademark of DuPont for a copolymer of tetrafluoroethylene and ethylene. It is an extrudable polymeric material for use in making thin walled radiated tubing for use as a heat shrunk covering or an electrical insulator.

The heat shrinkable tubing is shrunk around the carbon fiber bundle/electrical conductor wire assembly prior to inclusion in the blade. In fact, the heating element assembly is a finite, usable entity unto itself after the heat shrinkable tubing is shrunk, usable to heat any number of things-mirrors, headlights, tail lights, door gaskets on passenger train cars.

EXAMPLE III

A wiper blade according to a preferred embodiment of the present invention is manufactured as follows:

(1) Heat shrinkable tubing is cut to the desired finished length. For a finished wiper blade length of 18 inches, the heating element is somewhat shorter, e.g., 17½ inches.

(2) A ⅛ inch long slit is cut longitudinally in the geometric center of the tube.

(3) An appropriate number of carbon fiber strands are cut to length for an 18-inch long blade, and three 17½-inch long strands are cut.

(4) A 24-inch long length is cut of 22 gauge, tetrafluroethy polymer coated, stranded electrical wire. One and a half inches of each end are stripped.

(5) Both ends of the carbon fiber bundle are tightly wound with an end of the stripped electrical wire.

(6) The heating element/wire assembly is pulled through the heat shrinkable tube.

(7) The electrical wire is pulled through the slit in the heat shrinkable tube.

(8) The wire protruding from the middle of the tube is cut to make a live wire and a ground wire.

(9) The tube is shrunk, and the heating element will then produce heat if current is passed through it.

(10) The heating element is placed in a mold which holds the element in an appropriate geometric position within the mold cavity, with the wires protruding.

(11) The mold cavity is then filled with the desired compound and cured.

(12) The mold is opened and the finished wiper blade containing the heating element is removed.

The scope of the present invention should not be limited by the specific embodiments herein taught, but should be interpreted solely on the basis of the following, appended claims.

What is claimed is:

1. A heated wiper blade unit, comprising:
   an elastic, electrically non-conductive wiper blade having a length and, in cross section, a geometric center;
   a flexible, fibrous carbon heating element, including a plurality of elongated, fibrous carbon strands and a heat shrunk polymeric tube coaxially surrounding the strands, said heating element being disposed in the wiper blade, extending substantially along the length of the blade, and having first and second ends;
   a first live wire entering said blade at an intermediate point along said length and extending through said blade to establish an electrical connection with said carbon strands at the first end of the heating element; and a second ground wire entering said blade at an intermediate point along said length and establishing an electrical connection with the second end of the heating element.

2. A wiper blade unit according to claim 1, wherein said fibrous carbon heating element is disposed in the geometric center of the elastic wiper blade.

3. A wiper blade unit according to claim 1, wherein said first and second wires each comprise insulated lengths and stripped ends;

wherein the insulated length of the live wire enters the heat shrunk tube at an intermediate point along a length of the heat shrunk tube and runs inside the heat shrunk tube toward the first end of the heating element; wherein the stripped end of the live wire makes electrical contact with said plurality of strands at the first end of heating element;

wherein the insulated length of the ground wire enters the heat shrunk tube at an intermediate point along a length of the heat shrunk tube and runs inside the heat shrunk tube toward the second end of the heating element; and wherein the stripped end of the ground wire makes electrical contact with said plurality of strands at the second end of the heating element.

4. A heated wiper blade unit according to claim 3, wherein said insulated lengths of the first and second wires comprise tetrafluoroethylene polymer insulation.

5. A heated wiper blade unit according to claim 1, wherein said blade comprises room temperature vulcanizing rubber.

* * * * *